(12) United States Patent
Kwon et al.

(10) Patent No.: US 11,570,507 B2
(45) Date of Patent: Jan. 31, 2023

(54) DEVICE AND METHOD FOR VISUALLY DISPLAYING SPEAKER'S VOICE IN 360-DEGREE VIDEO

(71) Applicant: Samsung Electronics Co., Ltd., Suwon-si (KR)

(72) Inventors: Oh Yoon Kwon, Seoul (KR); I Seul Yu, Seoul (KR); Hyeon Ju Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/762,006

(22) PCT Filed: Sep. 18, 2018

(86) PCT No.: PCT/KR2018/010950
§ 371 (c)(1),
(2) Date: May 6, 2020

(87) PCT Pub. No.: WO2019/107719
PCT Pub. Date: Jun. 6, 2019

(65) Prior Publication Data
US 2021/0377593 A1    Dec. 2, 2021

(30) Foreign Application Priority Data

Nov. 29, 2017  (KR) .......................... 10-2017-0162242

(51) Int. Cl.
*H04N 21/431* (2011.01)
*G06F 3/01* (2006.01)
(Continued)

(52) U.S. Cl.
CPC ......... *H04N 21/4316* (2013.01); *G06F 3/011* (2013.01); *G06F 3/0482* (2013.01);
(Continued)

(58) Field of Classification Search
CPC .......... H04N 21/44026; H04N 21/252; H04N 21/42201; H04N 21/4884; H04N 21/42217; H04N 21/8543
(Continued)

(56) References Cited

U.S. PATENT DOCUMENTS 8,057,061 B2    11/2011 Otsuki et al.
8,183,997 B1    5/2012  Wong et al.
(Continued)

FOREIGN PATENT DOCUMENTS

EP           3 190 527 A1    7/2017
KR    10-2009-0089782 A     8/2009
(Continued)

OTHER PUBLICATIONS

Extended European Search Report dated Jul. 14, 2020, issued in European Application No. 18882409.8.
(Continued)

*Primary Examiner* — Jivka A Rabovianski
(74) *Attorney, Agent, or Firm* — Jefferson IP Law, LLP

(57) ABSTRACT

An electronic device is disclosed. In addition, various embodiments identified through the specification are possible. The electronic device includes a display, a processor, and a memory storing instructions that, when executed by the processor, cause the processor to display, when a video supporting a plurality of orientation regions is played, a screen of a first orientation region among the plurality of orientation regions and a first text corresponding to a voice of a first speaker in the screen, and display, in response to a user input of selecting a voice of a second speaker located in a second orientation region, a screen of the second orientation region.

15 Claims, 13 Drawing Sheets

(51) Int. Cl.
  *G06F 3/0482* (2013.01)
  *G06F 3/04842* (2022.01)
  *H04N 21/439* (2011.01)
  *H04N 21/4728* (2011.01)
  *H04N 21/488* (2011.01)
  *H04N 21/81* (2011.01)
(52) U.S. Cl.
  CPC ..... *G06F 3/04842* (2013.01); *H04N 21/4394* (2013.01); *H04N 21/4728* (2013.01); *H04N 21/4888* (2013.01); *H04N 21/816* (2013.01)
(58) Field of Classification Search
  USPC .................................. 725/25, 32, 37, 60, 61
  See application file for complete search history.

(56) References Cited

U.S. PATENT DOCUMENTS

| | | | |
|---|---|---|---|
| 8,493,204 | B2 | 7/2013 | Wong et al. |
| 8,958,742 | B2 | 2/2015 | Lee et al. |
| 9,639,251 | B2 | 5/2017 | Lee et al. |
| 9,838,814 | B2 | 12/2017 | Wong et al. |
| 10,691,402 | B2 | 6/2020 | Kim et al. |
| 2004/0189868 | A1* | 9/2004 | Molaro .......... H04N 21/440263 348/468 |
| 2010/0079573 | A1 | 4/2010 | Isaac |
| 2011/0037833 | A1* | 2/2011 | Lee .................... H04N 13/183 348/46 |
| 2011/0145428 | A1* | 6/2011 | Wei ..................... G06F 16/7844 709/231 |
| 2013/0070047 | A1 | 3/2013 | Digiovanni et al. |
| 2013/0124204 | A1 | 5/2013 | Wong et al. |
| 2013/0246967 | A1 | 9/2013 | Wheeler et al. |
| 2013/0279705 | A1 | 10/2013 | Wong et al. |
| 2014/0002582 | A1* | 1/2014 | Bear .................... G06F 3/0304 348/E7.083 |
| 2015/0170418 | A1 | 6/2015 | Flynn et al. |
| 2016/0093105 | A1 | 3/2016 | Rimon et al. |
| 2017/0139578 | A1 | 5/2017 | Dickerson et al. |

FOREIGN PATENT DOCUMENTS

| | | |
|---|---|---|
| KR | 10-2013-0137924 A | 12/2013 |
| KR | 10-2014-0091552 A | 7/2014 |
| KR | 10-2015-0009053 A | 1/2015 |

OTHER PUBLICATIONS

Korean Office Action dated Jun. 28, 2022, issued in Korean Application No. 10-2017-0162242.

* cited by examiner

DEVICE AND METHOD FOR VISUALLY DISPLAYING SPEAKER'S VOICE IN 360-DEGREE VIDEO

CROSS-REFERENCE TO RELATED APPLICATION(S)

This application is a U.S. National Stage application under 35 U.S.C. § 371 of an International application number PCT/KR2018/010950, filed on Sep. 18, 2018, which is based on and claimed priority of a Korean patent application number 10-2017-0162242, filed on Nov. 29, 2017, in the Korean Intellectual Property Office, the disclosure of which is incorporated by reference herein in its entirety.

TECHNICAL FIELD

Embodiments disclosed in the disclosure relate to a device and a method for visually displaying a voice of a speaker in a 360 video.

BACKGROUND ART

An electronic device (e.g., a smart phone, a computer device, or a virtual reality (VR) device) may play multimedia such as a photo, a video, a music, a game, or a broadcast. The electronic device may play a 360 video that supports a viewing angle of 360 degrees. Through the 360 video, the electronic device may provide an experience in which a user of the electronic device may identify not only an object located in a specific orientation region but also an object located in all orientation regions.

DISCLOSURE

Technical Problem

In the conventional art, while a 360 video supports a viewing angle of 360 degrees, a display size of an electronic device is limited. Therefore, the electronic device is not able to display a screen of a remaining orientation region while a screen of a specific orientation region (or may be referred to as an azimuth) is displayed in the 360 video. A user of the electronic device should provide the electronic device with a user input of moving a screen to identify a screen of another orientation region. When a voice of a speaker located in another orientation region is output while the screen of the specific orientation region is displayed, the user of the electronic device may be difficult to identify the corresponding speaker.

Various embodiments of the disclosure are intended to propose a device and a method for displaying a text corresponding to the voice output from the 360 video.

Technical Solution

An aspect of the disclosure provides an electronic device including a display, a processor electrically connected to the display, and a memory electrically connected to the processor, wherein the memory stores instructions that, when executed by the processor, cause the processor to display, when a video supporting a plurality of orientation regions is played, a screen of a first orientation region among the plurality of orientation regions through the display, display a first text corresponding to a voice of a first speaker in the screen, wherein the first speaker is located in the first orientation region, display a second text corresponding to a voice of a second speaker in the screen, wherein the second speaker is located in a second orientation region among the plurality of orientation regions, receive a user input of selecting one of the first text and the second text, and display a screen of an orientation region where a speaker corresponding to the selected text is located among the first orientation region and the second orientation region.

Another aspect of the disclosure provides a method of an electronic device including displaying, when a video supporting a plurality of orientation regions is played, a screen of a first orientation region among the plurality of orientation regions through a display of the electronic device, displaying a first text corresponding to a first speaker in the screen, wherein the first speaker is located in the first orientation region, displaying a second text corresponding to a second speaker in the screen, wherein the second speaker is located in a second orientation region among the plurality of orientation regions, receiving a user input of selecting one of the first text and the second text, and displaying a screen of an orientation region where a speaker corresponding to the selected text is located among the first orientation region and the second orientation region.

An aspect of the disclosure provides an electronic device including a communication module receiving a video supporting a plurality of orientation regions, a display, a processor electrically connected to the display, and a memory electrically connected to the processor, wherein the memory stores instructions that, when executed by the processor, cause the processor to display, when the video is received through the communication module, a screen of a first orientation region among the plurality of orientation regions through the display, display, when a voice of a first speaker is output, a first text converted from the voice of the first speaker in the screen, wherein the first speaker is located in the first orientation region, display, when a voice of a second speaker is output, a second text converted from the voice of the second speaker in the screen, wherein the second speaker is located in a second orientation region among the plurality of orientation regions, receive a user input of selecting one of the first text and the second text, and display a screen of an orientation region where a speaker corresponding to the selected text is located among the first orientation region and the second orientation region.

Advantageous Effects

According to the embodiments disclosed in the disclosure, the electronic device may visually display the voice output from the 360 video.

According to the embodiments disclosed in the disclosure, the user of the electronic device may conveniently identify the speaker corresponding to the voice output from the 360 video.

In addition, various effects that may be directly or indirectly identified through the disclosure may be provided.

DESCRIPTION OF DRAWINGS

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
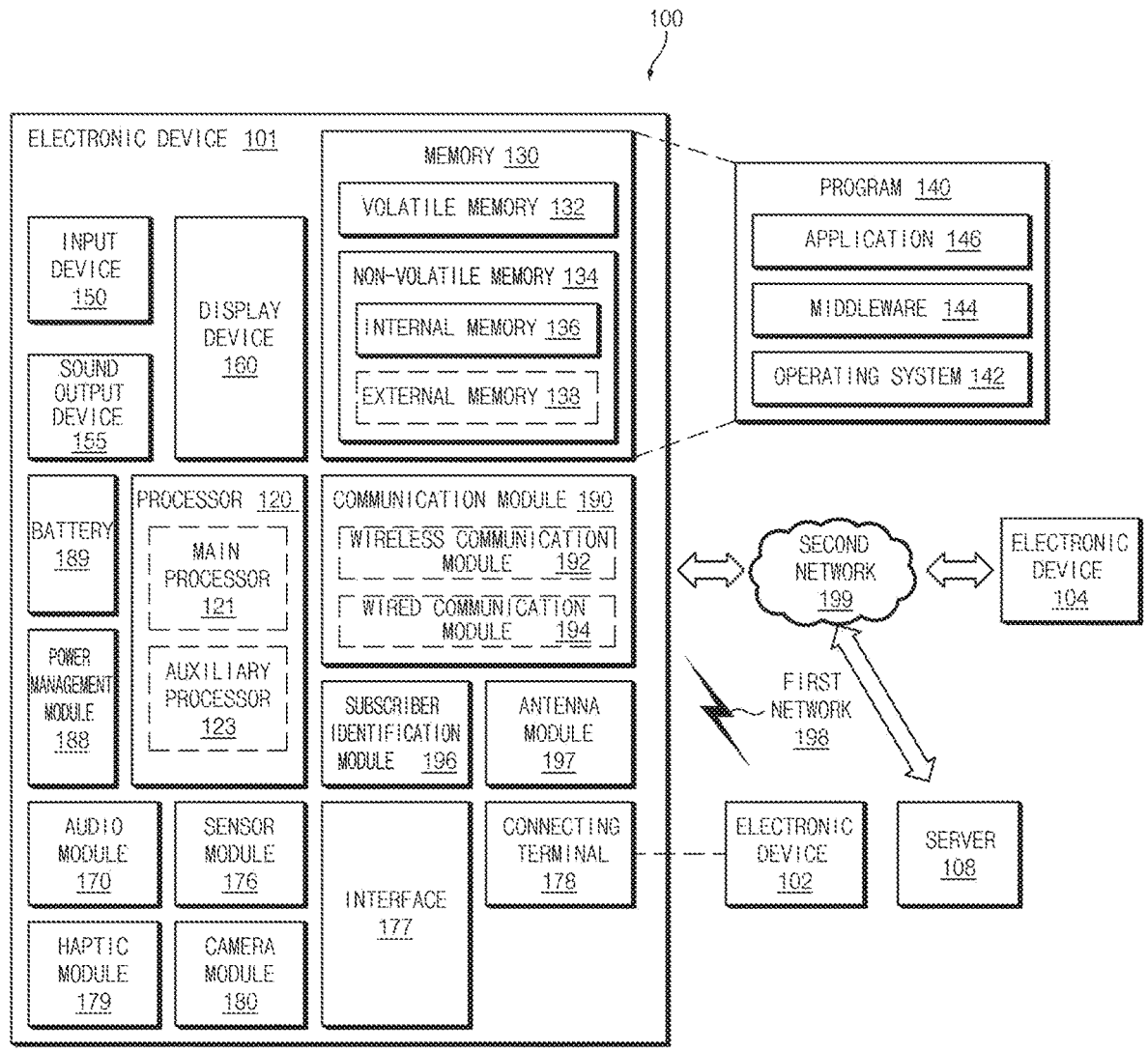
FIG. 1 is a block diagram of an electronic device in a network environment according to various embodiments.

FIG. 1 is a block diagram of an electronic device in a network environment according to various embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

In various embodiments to be described below, the electronic device 101 may include at least one of a portable communication device (e.g. a smartphone), a computer device, a portable multimedia device, a portable medical device, a camera, a wearable device, a headset or a form factor supporting a virtual reality (VR) function, and home appliances.

Figure 2:
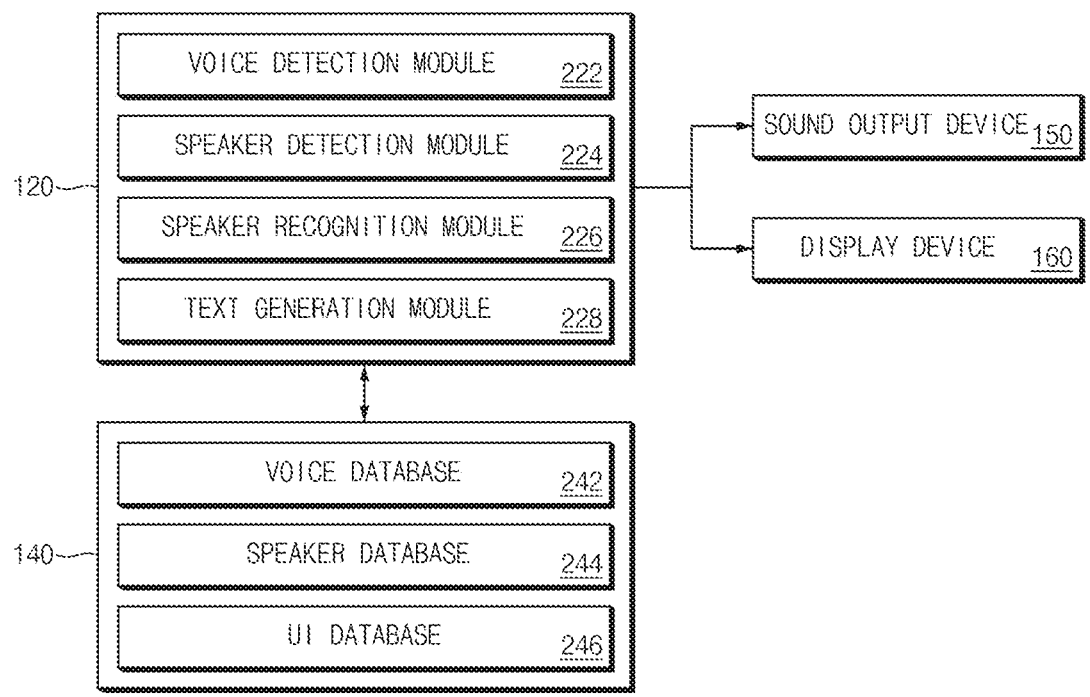
FIG. 2 illustrates a block diagram of an electronic device that visually displays a voice in a 360 video according to various embodiments.

FIG. 2 illustrates a block diagram of an electronic device that visually displays a voice in a 360 video according to various embodiments.

Referring to FIG. 2, when a video is played, the processor 120 (e.g., the processor 120 in FIG. 1) may output a voice included in the video through the sound output device 155, and output an image included in the video through the display device 160 (e.g., a display). In various embodiments disclosed in the disclosure, the video played by the electronic device 101 or the processor 120 may mean a video previously stored in the memory 140 of the electronic device 101, or a broadcast video or a streaming video that comes in real time through the communication module 190 of the electronic device 101. In addition, in various embodiments disclosed in the disclosure, the video played by the electronic device 101 may support viewing angles of all directions. For example, the viewing angle of the video may include 180 degrees or 360 degrees. Because a size of the display (e.g., the display device 160) of the electronic device 101 is limited, the electronic device 101 is not able to display an entirety of the viewing angle supported by the video at once. For example, while displaying a screen corresponding to a specific orientation region (which may be referred to as an azimuth), the electronic device 101 is not able to display a screen corresponding to another orientation region.

According to an embodiment, the processor 120 may include a voice detection module 222, a speaker detection module 224, a speaker recognition module 226, and a text generation module 228. The processor 120 may determine a speaker corresponding to a voice through each module, and display a text converted from the voice together with the determined speaker. Each of the modules illustrated in FIG. 2 may be a hardware component integrated with the processor 120, or may be a component built in the electronic device 101 separately from the processor 120. In addition, each module may be a software component stored in the memory 140 and executed by the processor 120.

According to an embodiment, the voice detection module 222 may detect and analyze the voice. For example, the voice detection module 222 may extract characteristics (e.g., at least one of a frequency, a tone, a wavelength, an energy, a zero crossing, and a linear predictive coding (LPC)) of the voice, and compare the extracted characteristics of the voice with a voice database 242 stored in the memory 140. The voice detection module 222 may detect and analyze the voice based on, for example, a hidden markrov model (HMM) technique. The voice detection module 222 may store information about the analyzed voice in the voice database 242. When a new characteristics not stored in the voice database 242 is detected, the voice detection module 222 may update information about the new characteristics in the voice database 242.

According to an embodiment, the speaker detection module 224 may detect and analyze a face or a clothing of the speaker displayed when the video is played. The speaker may be referred to as an object or a character. For example, the speaker detection module 224 may extract a face contour of the speaker using discontinuous points of pixel brightness constituting the image. In another example, the speaker detection module 224 may convert an image format from RGB to YCbCr, and detect a skin region through color components Cb and Cr. In another example, the speaker detection module 224 may convert the image into a gray or a binary form and compare the converted image with a speaker database 244 stored in the memory 140 to detect a feature (e.g., eyes, a nose, a mouth, and the like) of the speaker's face. The speaker detection module 224 may store information about the analyzed speaker in the speaker database 244. When a new feature not stored in the speaker database 244 is detected, the speaker detection module 224 may update the information on the new feature in the speaker database 244.

According to an embodiment, the speaker recognition module 226 may determine the speaker corresponding to the output voice. According to an embodiment, the speaker recognition module 226 may determine the speaker corresponding to the output voice by comparing the information about the voice stored in the voice database 242 with the information about the speaker stored in the speaker database 244. For example, when a gender of the voice output is female, the speaker recognition module 226 may determine that a speaker whose gender is female matches the output voice among the information about the speaker stored in the speaker database 244. The speaker recognition module 226 may store information about the matched voice and speaker in the memory 140. When a voice of a speaker, which is the same as a previously output voice, is output, the speaker recognition module 226 may determine the speaker corresponding to the voice using previously stored information.

According to an embodiment, the text generation module 228 may convert the voice to the text. The text generation module 228 may convert the voice to the text using the information about the voice analyzed by the voice detection module 222 and stored in the voice database 242. The text generation module 228 may generate various forms of texts using information stored in a user interface (UI) database 246. For example, the text generation module 228 may generate the text converted from the voice together with an image of the speaker corresponding to the voice. In another example, the text generation module 228 may generate the text converted from the voice in a form of a speech bubble.

According to an embodiment, the processor 120 may display the text corresponding to the output voice through the display device 160 while the voice is output through the sound output device 155. The processor 120 may display the image of the speaker corresponding to the output voice together with the text or display the text in the form of the speech bubble such that the speaker of the displayed text is identified.

Figure 3:
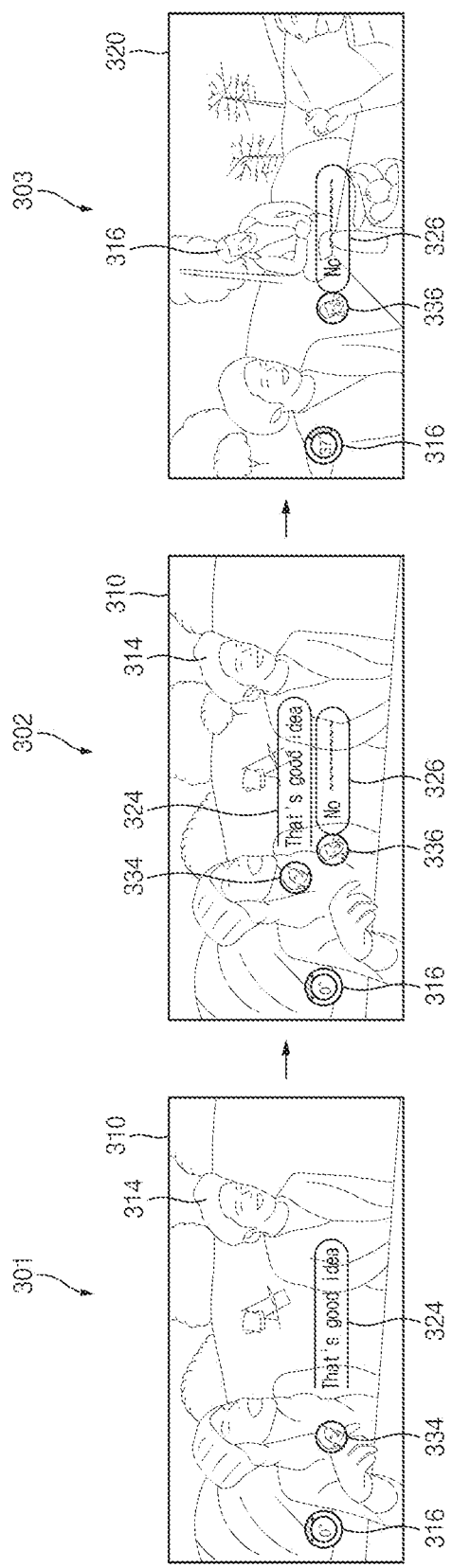
FIG. 3 illustrates an operation of displaying a text and an image of a speaker corresponding to a voice according to various embodiments.

FIG. 3 illustrates an operation of displaying a text and an image of a speaker corresponding to a voice according to various embodiments.

Referring to a reference numeral 301 in FIG. 3, the electronic device 101 may display a screen 310 of a first orientation region among a plurality of orientation regions. The first orientation region may mean, for example, a region in which the azimuth is 0 degrees in a 360 video. The electronic device 101 may display a first speaker 314 located in the first orientation region in the screen 310 of the first orientation region.

According to an embodiment, the electronic device 101 may display an UI 316 indicating the azimuth of the displayed screen. For example, the screen 310 of the first orientation region is a screen corresponding to the first orientation region (that is, the region where the azimuth is 0 degrees), the electronic device 101 may control the UI 316 to display 0 degrees.

According to an embodiment, the electronic device 101 may detect a voice output at a first time point (1 hour 25 minutes 35 seconds), and determine that a speaker of the detected voice is the first speaker 314. The electronic device 101 may display a first text 324 corresponding to the voice of the first speaker 314 in the screen 310 of the first orientation region while the voice of the first speaker 314 is output at the first time point. The electronic device 101 may display a first image 334 representing the first speaker 314 together with the first text 324. According to an embodiment, the electronic device 101 may generate the first image 334 based on information of the first speaker 314 stored in the speaker database 244. For example, the electronic device 101 may generate the first image 334 using a face of the first speaker 314 extracted by the speaker detection module 224. The first image 334 may include the face or a clothing of the first speaker 314.

Referring to a reference numeral 302 in FIG. 3, the electronic device 101 may detect a voice output at a second time point (1 hour 25 minutes 45 seconds), and determine that a speaker of the detected voice is a second speaker 316.

The second speaker 316 may be located in a second orientation region different from the first orientation region. The electronic device 101 may display a second text 326 corresponding to the voice of the second speaker 316 in the screen 310 of the first orientation region while the voice of the second speaker 316 is output at the second time point. The electronic device 101 may display a second image 336 representing the second speaker 316 together with the second text 326. The electronic device 101 may generate the second image 336 on a principle similar to a principle of generating the first image 334. FIG. 3 illustrates an example in which the first text 324 moves upward when the second text 326 is displayed, but the electronic device 101 may control the first text 324 and the first image 334 to disappear from the screen 310 of the first orientation region when the second text 326 is displayed.

Referring to a reference numeral 303 in FIG. 3, the electronic device 101 may display a screen (hereinafter, referred to as a screen 320 of the second orientation region) of an orientation region (that is, the second orientation region) in which the second speaker 316 is located in response to a user input of selecting the second text 326 or the second image 336. For example, the electronic device 101 may control the second speaker 316 to be positioned in a center of the screen 320 of the second orientation region. According to an embodiment, the electronic device 101 may control the UI 316 to display an azimuth (that is, 37 degrees) corresponding to the second orientation region. FIG. 3 illustrates an example in which the first text 324 and the first image 334 are not displayed while the screen 320 of the second orientation region is displayed, but the electronic device 101 may control the first text 324 and the first image 334 to be respectively displayed above the second text 326 and the second image 336 in the screen 320 of the second orientation region.

Figure 4:
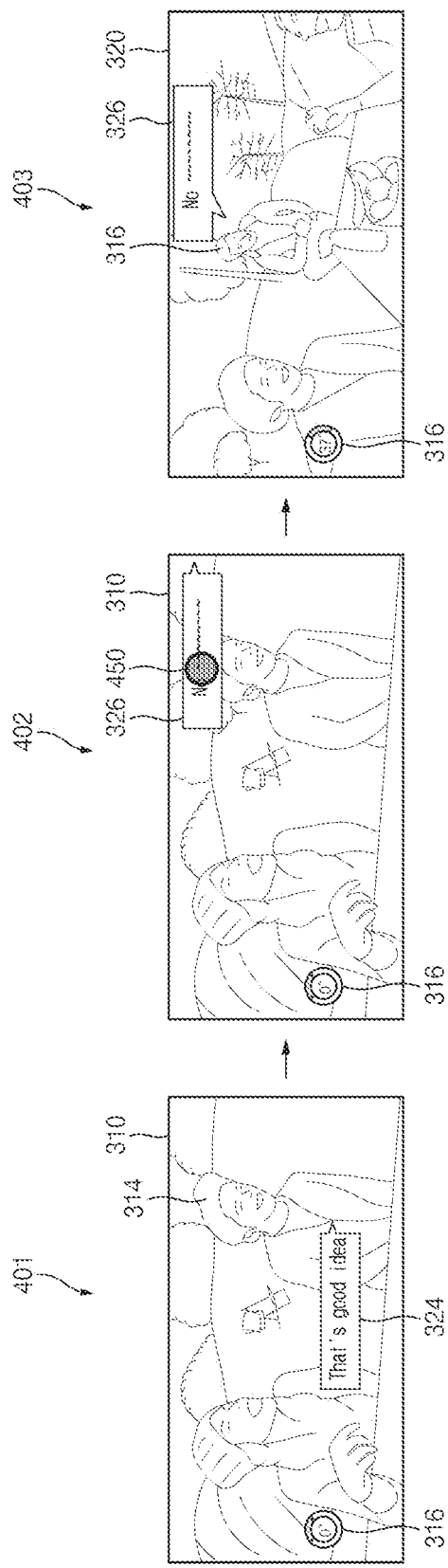
FIG. 4 illustrates an operation of displaying a text of a speaker corresponding to a voice as a speech bubble according to various embodiments.

FIG. 4 illustrates an operation of displaying a text of a speaker corresponding to a voice as a speech bubble according to various embodiments.

Referring to a reference numeral 401 in FIG. 4, the electronic device 101 may display the screen 310 of the first orientation region including the first speaker 314. The electronic device 101 may display the UI 316 indicating the azimuth of the screen 310 of the first orientation region in the screen 310 of the first orientation region. The electronic device 101 may detect the voice of the first speaker 314 output at the first time point, and display the first text 324 corresponding to the voice of the first speaker 314 in the form of the speech bubble. According to an embodiment, the electronic device 101 may display an indicator (For example, a first indicator 434 in FIG. 9) indicating that the output voice corresponds to the first speaker 314.

Referring to a reference numeral 402 in FIG. 4, the electronic device 101 may detect the voice of the second speaker 316 output at the second time point, and display the second text 326 corresponding to the voice of the second speaker 316 in the screen 310 of the first orientation region in the form of the speech bubble. When the second speaker 316 is located at a right region of the first orientation region, the electronic device 101 may control the second text 326 in the form of the speech bubble to be displayed at a right side of the screen 310 of the first orientation region.

Referring to a reference numeral 403 in FIG. 4, in response to a user input 450 of selecting the second text 326 in the form of the speech bubble, the electronic device 101 may display the screen 320 of the second orientation region including the second speaker 316. For example, the electronic device 101 may control the second speaker 316 to be positioned in the center of the screen 320 of the second orientation region. According to an embodiment, the electronic device 101 may control the UI 316 to indicate an azimuth (that is, 37 degrees) corresponding to the second orientation region.

According to an embodiment, the electronic device 101 may display the first text 324 in the form of the speech bubble and the second text 326 in the form of the speech bubble with different background colors. For example, the electronic device 101 may determine the background colors of the speech bubbles based on skin colors, hair colors, or clothing colors of the first speaker 314 and the second speaker 316. According to another embodiment, the electronic device 101 may display the first text 324 and the second text 326 with different text colors based on the skin colors, the hair colors, or the clothing colors of the first speaker 314 and the second speaker 316.

Figure 5:
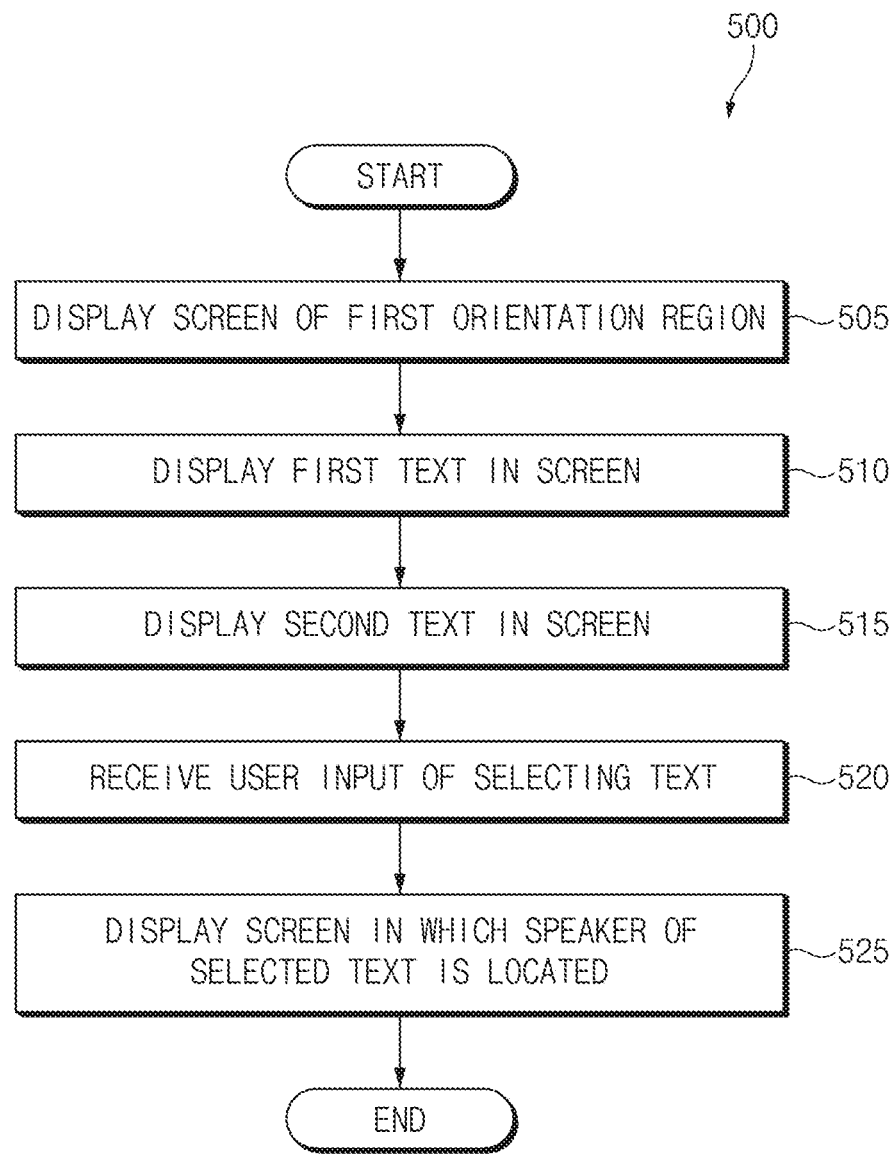
FIG. 5 illustrates an operational flowchart of an electronic device that moves a screen based on a text of a speaker corresponding to a voice according to various embodiments.

FIG. 5 illustrates an operational flowchart of an electronic device that moves a screen based on a text of a speaker corresponding to a voice according to various embodiments.

Operations illustrated in FIG. 5 may be implemented by the electronic device 101 or the processor 120. In addition, when instructions included in the memory 140 are executed by the processor 120, the instructions may cause the processor 120 to implement the operations illustrated in FIG. 5.

Referring to FIG. 5, in operation 505 in a method 500, the processor 120 may display the screen 310 of the first orientation region among the plurality of orientation regions through a display. The screen 310 of the first orientation region may include the first speaker 314. According to an embodiment, the processor 120 may display the UI 316 indicating the azimuth of the first orientation region through the display.

In operation 510, when the voice of the first speaker 314 is output, the processor 120 may display the first text 324 converted from the voice of the first speaker 314 in the screen 310 of the first orientation region. According to an embodiment, the processor 120 may display the first text 324 together with the first image 334 representing the face of the first speaker 314. According to another embodiment, the processor 120 may display the first text 324 in the form of the speech bubble.

In operation 515, when the voice of the second speaker 316 is output, the processor 120 may display the second text 326 converted from the voice of the second speaker 316 in the screen 310 of the first orientation region. The second speaker 316 may be located in the second orientation region different from the first orientation region. The processor 120 may display the second text 326 together with the second image 336 representing the face of the second speaker 316, or display the second text 326 in the form of the speech bubble.

In operation 520, the processor 120 may receive a user input of selecting one among the first text 324 and the second text 326. For example, when the first text 324 and the second text 326 are respectively displayed with the first image 334 and the second image 336, the processor 120 may receive a user input of selecting the text or the image. In another example, when the first text 324 and the second text 326 are respectively displayed as the speech bubbles, the processor 120 may receive a user input of selecting the speech bubble.

In operation 525, the processor 120 may display a screen of an orientation region in which a speaker corresponding to the selected text is located, among the first orientation region and the second orientation region. Through the above-described method 500, the electronic device 101 may provide convenience such that the user of the electronic device 101 may easily identify a speaker located in another orientation region by displaying the text of the speaker corresponding to the output voice.

Figure 6:
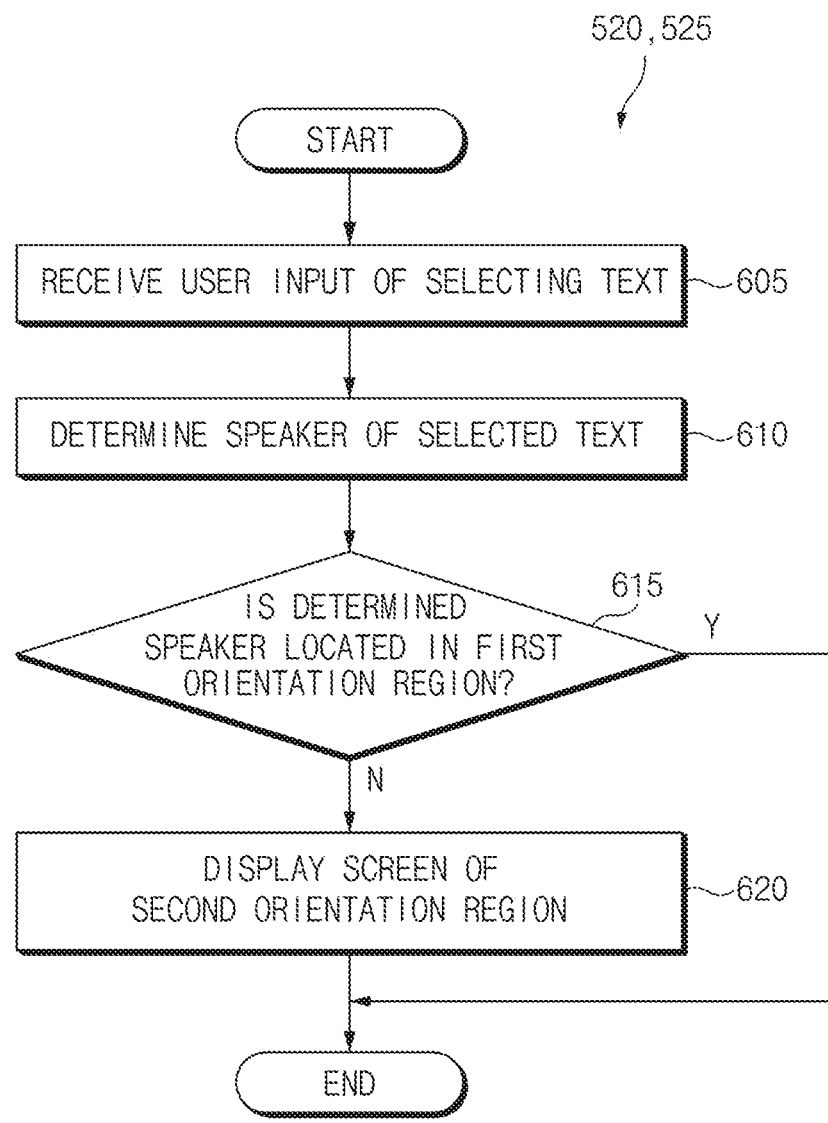
FIG. 6 illustrates an operational flowchart of an electronic device that determines an orientation region in which a speaker corresponding to a voice is located according to various embodiments.

FIG. 6 illustrates an operational flowchart of an electronic device that determines an orientation region in which a speaker corresponding to a voice is located according to various embodiments. Operations in FIG. 6 to be described below may be implemented by specifically limiting the operations 520 and 525 in FIG. 5.

Referring to FIG. 6, in operation 605, the processor 120 may receive the user input of selecting one among the first text 324 and the second text 326. In operation 610, the processor 120 may determine the speaker of the selected text.

In operation 615, the processor 120 may determine whether the determined speaker is located in the first orientation region. When the determined speaker is located in the first orientation region (that is, the first speaker 314), the processor 120 may terminate an algorithm. When the determined speaker is not located in the first orientation region, the processor 120 may determine that the speaker is located in another orientation region (e.g., the second orientation region), and proceed to operation 620.

In the operation 620, the processor 120 may display the screen 320 of the second orientation region in which the determined speaker is located. The processor 120 may display the screen such that the speaker is positioned in the center or such that the speaker is positioned together with another speaker.

Figure 7:
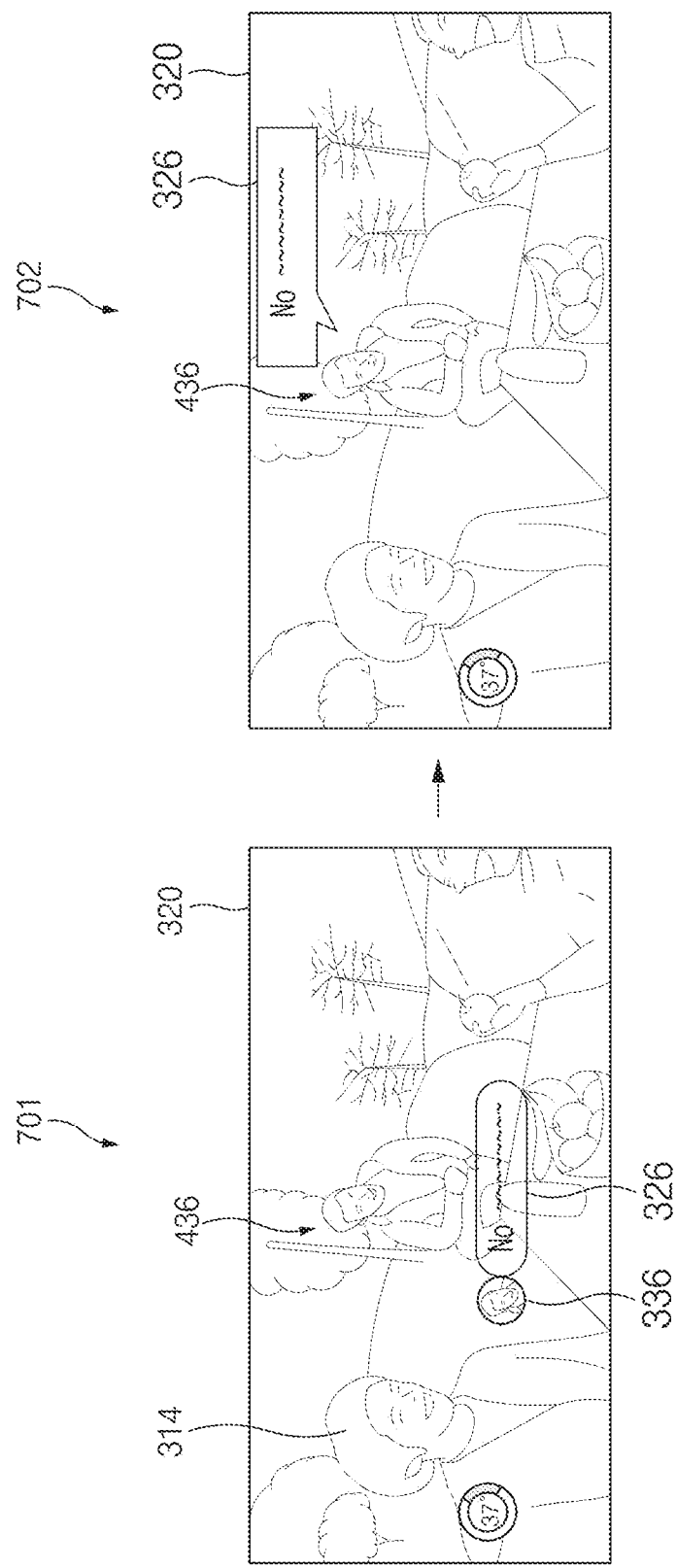
FIG. 7 illustrates an operation of displaying an indicator of a speaker corresponding to a voice according to various embodiments.

FIG. 7 illustrates an operation of displaying an indicator of a speaker corresponding to a voice according to various embodiments.

Referring to a reference numeral 701 in FIG. 7, the electronic device 101 may display the screen 320 of the second orientation region in which the second speaker 316 is located in response to the user input of selecting the second text 326 or the second image 336. The electronic device 101 may display a second indicator 436 indicating the second speaker 316 together with the second text 326 and the second image 336 corresponding to the output voice in the screen 320 of the second orientation region. Referring to a reference numeral 702 in FIG. 7, the electronic device 101 may not display the second text 326 and the second image 336, and display the second text 326 in the form of the speech bubble together with the second indicator 436 in the screen 320 of the second orientation region.

Figure 8:
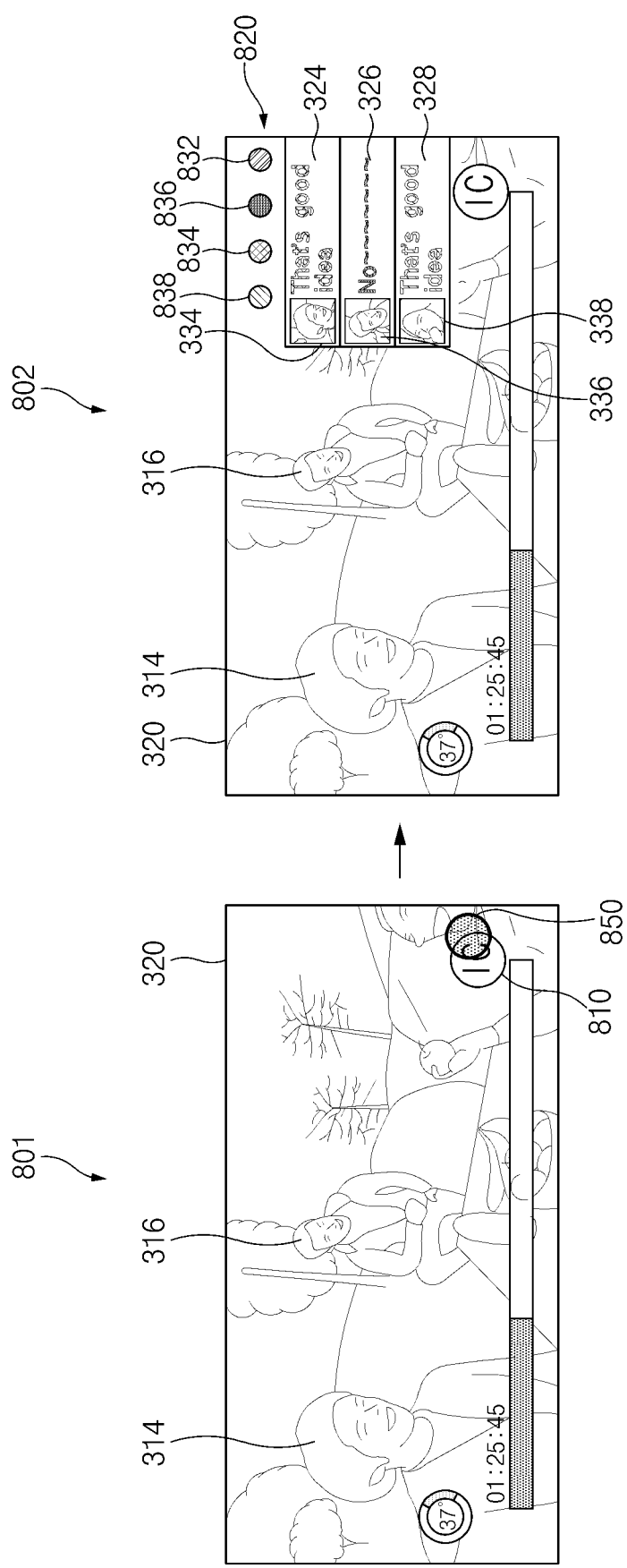
FIG. 8 illustrates an operation of displaying a list including a plurality of texts according to various embodiments.

FIG. 8 illustrates an operation of displaying a list including a plurality of texts according to various embodiments.

Referring to a reference numeral 801 in FIG. 8, the electronic device 101 may display a list button 810 for calling a list including a plurality of texts while a screen of a specific orientation region (e.g., the screen 320 of the second orientation region) is displayed. FIG. 8 illustrates an example in which the list button 810 is displayed at a bottom right of the screen, but a position where the list button 810 is displayed is not limited.

Referring to a reference numeral 802 in FIG. 8, in response to a user input 850 of selecting the list button 810, the electronic device 101 may display a list 820 including a plurality of texts. For example, the list 820 may include the first text 324 converted from the voice of the first speaker 314, the second text 326 converted from the voice of the second speaker 316, and a third text 328 converted from a voice of a third speaker 318. The electronic device 101 may display the plurality of texts in the list 820 based on an order of playback times of the plurality of texts. The electronic device 101 may display the first image 334 including an image of the face of the first speaker 314, the second image 336 including an image of the face of the second speaker 316, and a third image 338 including an image of a face of the third speaker 318 at sides of the plurality of texts, respectively.

According to an embodiment, the plurality of texts displayed in the list 820 and the plurality of images may be scrolled upward based on a playback time point of the video. For example, when the voice corresponding to the second text 326 is output at a specific time point and then the voice corresponding to the third text 328 is output, the electronic device 101 may control the texts such that the second text 326 is scrolled upward and the third text 328 is positioned in a center of the list 820 while the voice corresponding to the third text 328 is being output.

According to an embodiment, colors of the plurality of texts displayed in the list 820 may be different from each other. For example, the electronic device 101 may determine the colors of the plurality of texts displayed in the list 820 based on a skin color, a hair color, or a clothing color of a speaker detected through the speaker detection module 224. Information about the colors of the plurality of texts may be stored in the speaker database 244.

According to an embodiment, the electronic device 101 may display a button representing a specific speaker on a top of the list 820. Each button may be displayed in the same color as the color of each of the plurality of texts displayed in the list 820. For example, when a color of the first text 324 is blue, the electronic device 101 may display a first button 834 representing the first speaker 314 in blue. In a similar principle, the electronic device 101 may represent a second button 836 representing the second speaker 316 in yellow, a third button 838 representing the third speaker 318 in green, and a fourth button 832 representing another speaker in red.

Figure 9:
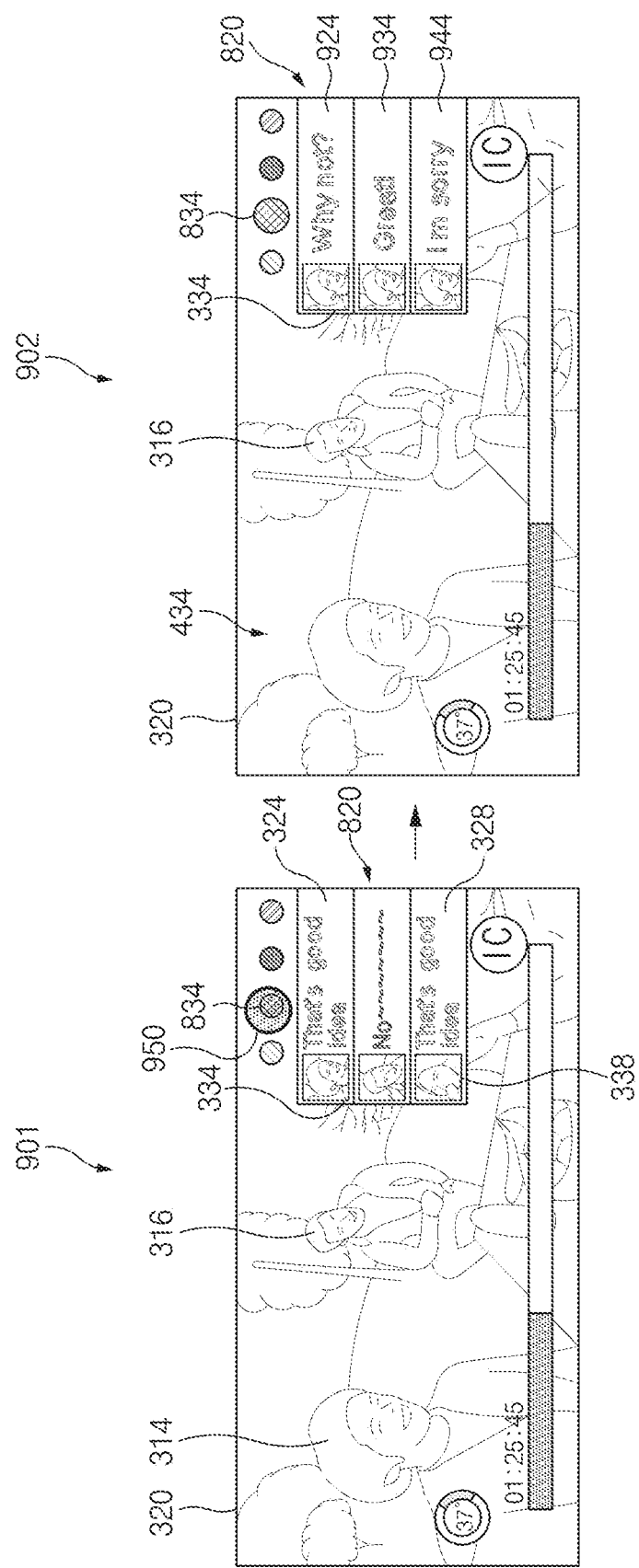
FIG. 9 illustrates an operation of controlling a list to include only a text corresponding to a selected speaker according to various embodiments.

FIG. 9 illustrates an operation of controlling a list to include only a text corresponding to a selected speaker according to various embodiments.

Referring to a reference numeral 901 in FIG. 9, the electronic device 101 may receive a user input 950 of selecting the first button 834 from among the plurality of buttons displayed together with the list 820. Referring to a reference numeral 902 in FIG. 9, the electronic device 101 may display a plurality of texts corresponding to the first speaker 314 in the list 820 based on a time order. The electronic device 101 may display the first image 334 in the list 820 or set colors of the plurality of texts to be the same as the color of the first button 834 to indicate a speaker of the texts included in the list 820. In another example, the electronic device 101 may display the first indicator 434 indicating the first speaker 314.

Figure 10:
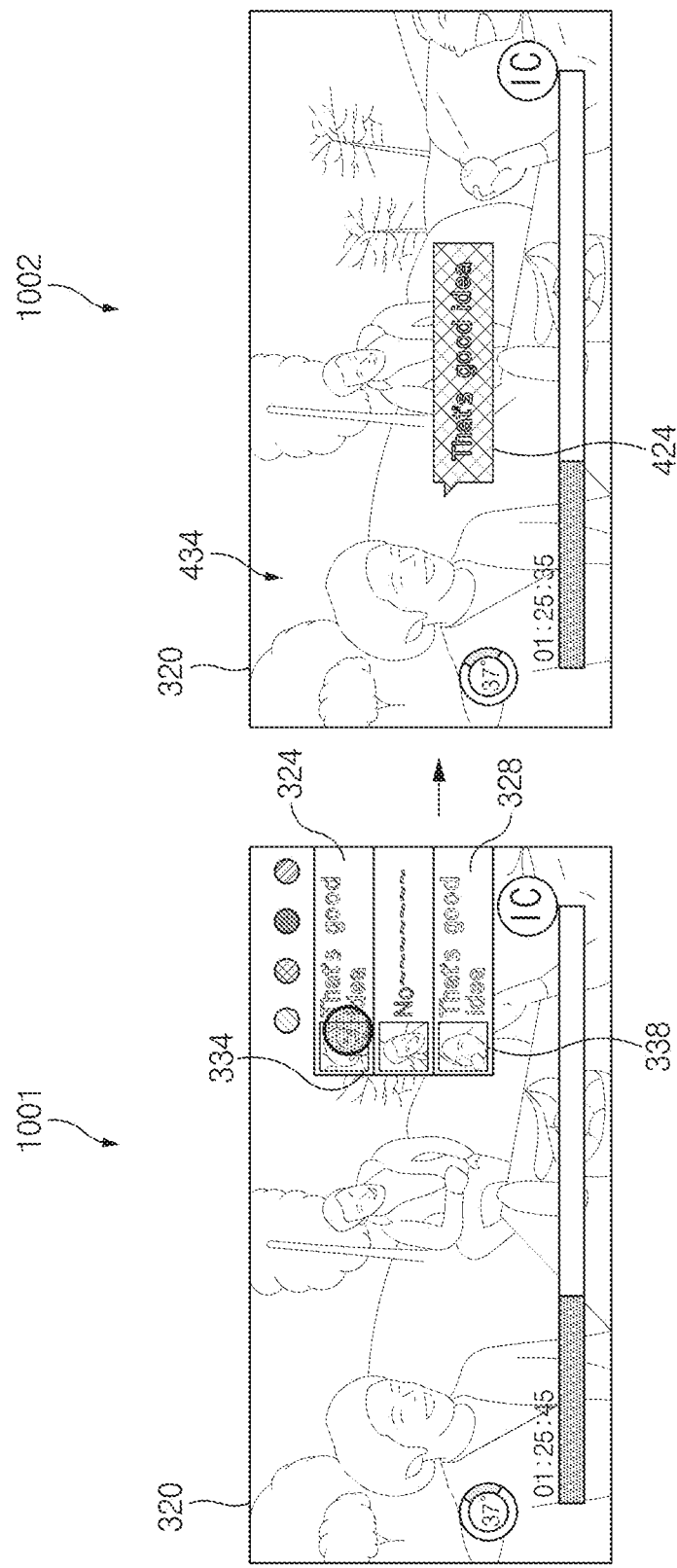
FIG. 10 illustrates an operation of displaying a screen at a playback time point corresponding to a text selected from a list according to various embodiments.

FIG. 10 illustrates an operation of displaying a screen at a playback time point corresponding to a text selected from a list according to various embodiments.

Referring to a reference numeral 1001 in FIG. 10, the electronic device 101 may display the screen 320 of the second orientation region including the list 820 at the second time point (e.g., 1 hour 25 minutes 45 seconds). The electronic device 101 may receive a user input 1050 of selecting the first text 324 among the plurality of texts included in the list 820. In another example, the electronic device 101 may receive a user input of selecting the first image 334 among the plurality of images included in the list 820.

Referring to a reference numeral 1002 in FIG. 10, the electronic device 101 may display a screen at the first time point (e.g., 1 hour 25 minutes 35 seconds) at which the voice corresponding to the first text 324 is output without moving an orientation region of the displayed screen. The electronic device 101 may display the first text 324 together with the first image 334 or in the form of the speech bubble at the first time point.

Figure 11:
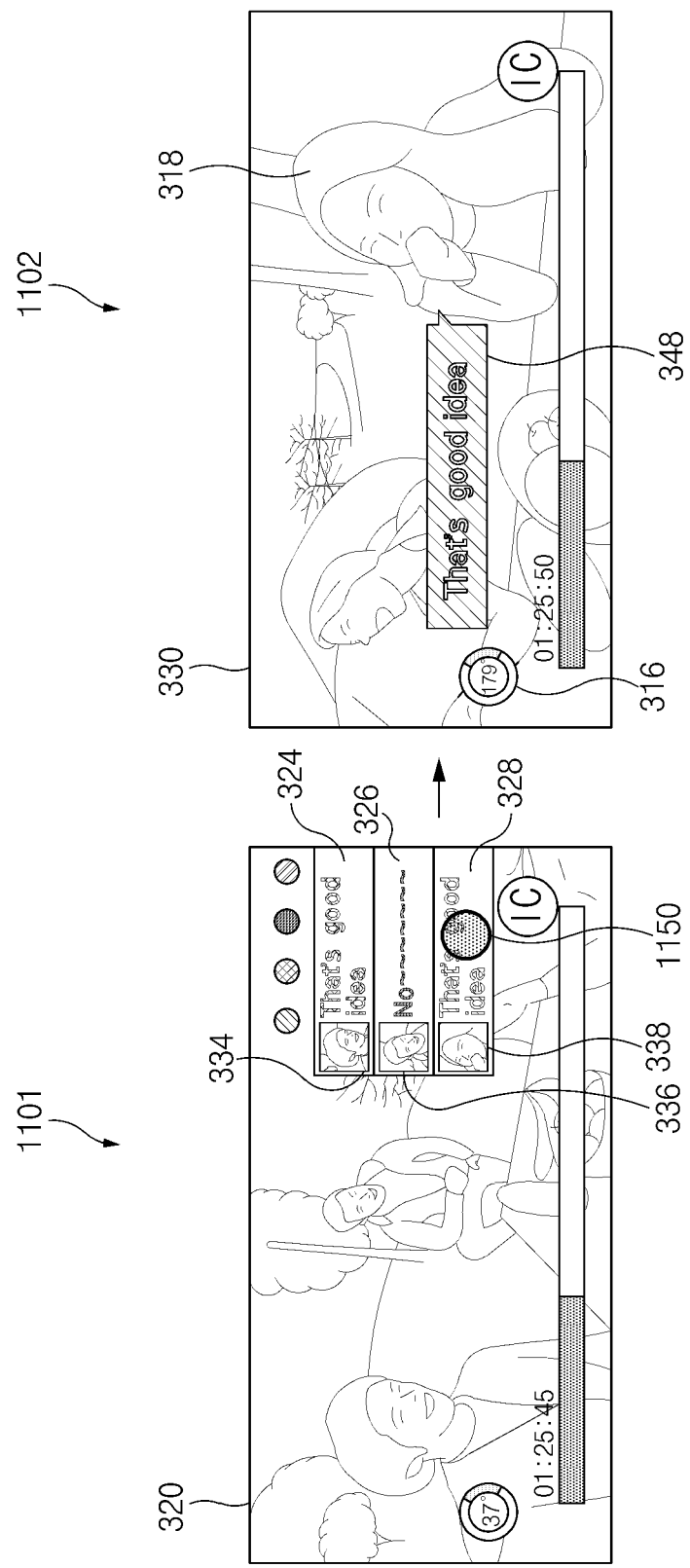
FIG. 11 illustrates an operation of displaying a screen of an orientation region at a playback time point corresponding to a text selected from a list according to various embodiments.

FIG. 11 illustrates an operation of displaying a screen of an orientation region at a playback time point corresponding to a text selected from a list according to various embodiments.

Referring to a reference numeral 1101 in FIG. 11, the electronic device 101 may display the screen 320 of the second orientation region (e.g., the region in which azimuth is 37) at the second time point (e.g., 1 hour 25 minutes 45 seconds). The electronic device 101 may receive a user input 1150 of selecting the third text 328 corresponding to the voice of the third speaker 318 while the voice corresponding to the second text 326 is output. In another example, the electronic device 101 may receive a user input of selecting the third image 338 including the image of the face of the third speaker 318 instead of the third text 328. The third speaker 318 may be located in a third orientation region different from the second orientation region.

Referring to a reference numeral 1102 in FIG. 11, the electronic device 101 may display a screen 330 of the third orientation region where the third speaker 318 is located at a third time point (e.g., 1 hour 25 minutes 50 seconds) at which the voice corresponding to the third text 328 is output. The electronic device 101 may control the UI 316 representing the azimuth to display an azimuth (that is, 179 degrees) corresponding to the third orientation region. The electronic device 101 may display the third text 328 together with the third image 338 or in the form of the speech bubble in the screen 330 of the third orientation region.

Figure 12:
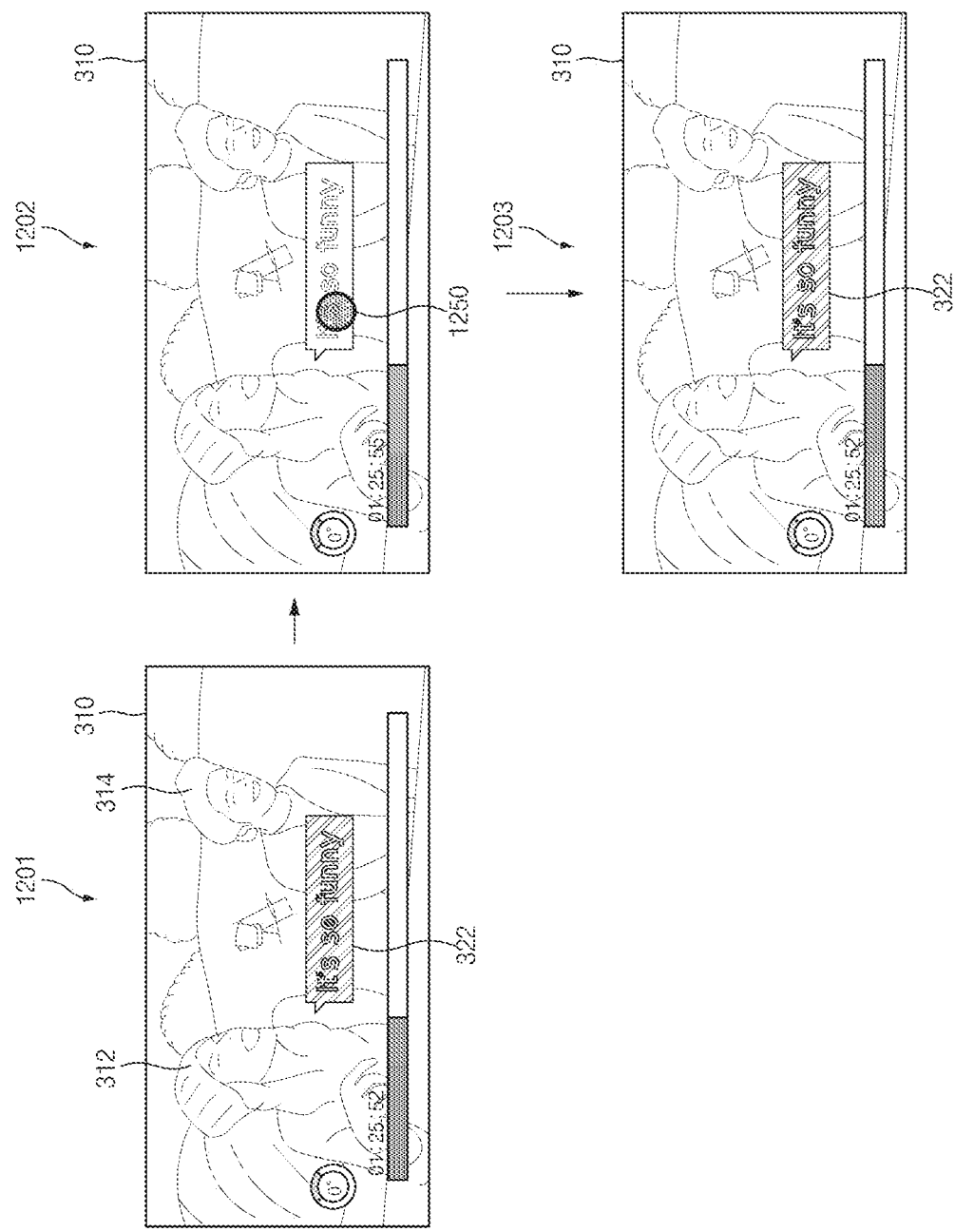
FIG. 12 illustrates an operation of changing a playback time point in response to a user input selecting a text according to various embodiments.

FIG. 12 illustrates an operation of changing a playback time point in response to a user input selecting a text according to various embodiments.

Referring to a reference numeral 1201 in FIG. 12, the electronic device 101 may display the screen 310 of the first orientation region in which the first speaker 314 and a fourth speaker 312 are located at a fourth time point (e.g., 1 hour 25 minutes 52 seconds). The electronic device 101 may display a fourth text 322 corresponding to a voice output while a voice of the fourth speaker 312 is output in the form of the speech bubble. In another example, the electronic device 101 may display the fourth text 322 together with an image including an image of a face of the fourth speaker 312 in the screen 310 of the first orientation region.

Referring to a reference numeral 1202 in FIG. 12, the electronic device 101 may apply an effect in which the fourth text 322 disappears at a fifth time point (e.g., 1 hour 25 minutes 55 seconds). The electronic device 101 may receive a user input 1250 of selecting the fourth text 322 before the fourth text 322 completely disappears from the screen 310 of the first orientation region.

Referring to a reference numeral 1203 in FIG. 12, in response to the user input 1250 of selecting the fourth text 322, the electronic device 101 may change the playback time point of the video from the fifth time point to the fourth time point. Through the above-described method, the electronic device 101 may change the playback time point of the video based on the user input of selecting the text.

Figure 13:
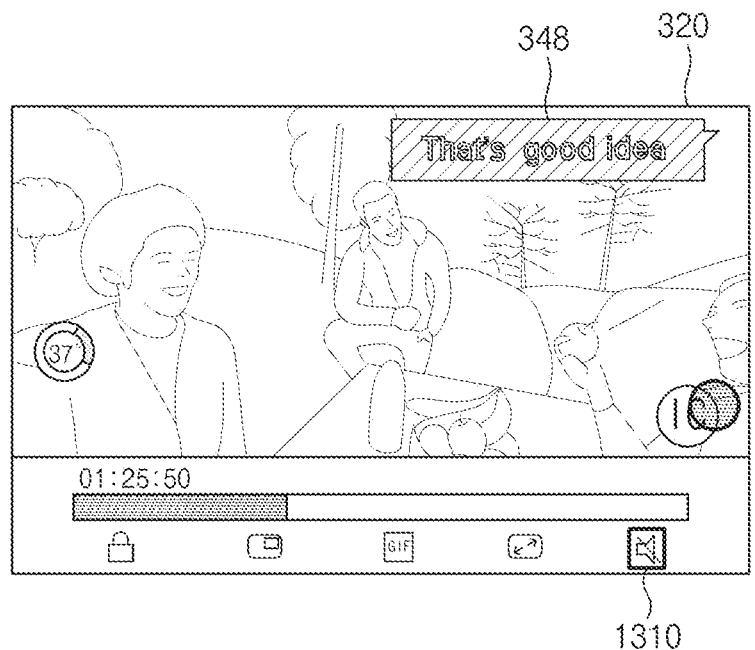
FIG. 13 illustrates an operation of controlling a voice output according to various embodiments.

FIG. 13 illustrates an operation of controlling a voice output according to various embodiments.

Referring to FIG. 13, the electronic device 101 may display a third text 348 of the third speaker 318 in the form of the speech bubble while the screen 320 of the second orientation region is displayed. The electronic device 101 may control a volume of the played video to be 0 in response to a user input of selecting a mute button 1310. Even while a voice is not output, the electronic device 101 may visually provide conversation contents of speakers by displaying a text (e.g., the third text 348) corresponding to the voice.

As described above, an electronic device (e.g., the electronic device 101 in FIG. 1) includes a display (e.g., the display device 160 in FIG. 1), a processor (e.g., the processor 120 in FIG. 1) electrically connected to the display, and a memory (e.g., the memory 130 in FIG. 1) electrically connected to the processor, wherein the memory stores instructions that, when executed by the processor, cause the processor to display, when a video supporting a plurality of orientation regions is played, a screen of a first orientation region among the plurality of orientation regions through the display, display a first text corresponding to a voice of a first speaker in the screen, wherein the first speaker is located in the first orientation region, display a second text corresponding to a voice of a second speaker in the screen, wherein the second speaker is located in a second orientation region among the plurality of orientation regions, receive a user input of selecting one of the first text and the second text, and display a screen of an orientation region where a speaker corresponding to the selected text is located among the first orientation region and the second orientation region.

According to an embodiment, the instructions may cause the processor to display the screen of the first orientation region when the selected text corresponds to the first speaker, wherein the first orientation region may include an orientation region where the first speaker is located in a center of the screen, and display the screen of the second orientation region when the selected text corresponds to the second speaker, wherein the second orientation region may include an orientation region where the second speaker is located in a center of the screen.

According to an embodiment, the instructions may cause the processor to display an indicator indicating a speaker corresponding to an output voice among the first speaker and the second speaker.

According to an embodiment, the instructions may cause the processor to display an image of the first speaker together with the first text, and display an image of the second speaker together with the second text.

According to an embodiment, the instructions may cause the processor to display the first text or the second text in a form of a speech bubble.

According to an embodiment, the instructions may cause the processor to display a list button for calling a list including the first text and the second text through the display, receive a user input of selecting the list button, display the list through the display, and display a first button indicating the first speaker and a second button indicating the second speaker on a top of the list.

According to an embodiment, the instructions may cause the processor to receive a user input of selecting one of the first button and the second button, and control the list such that the list includes a plurality of texts of a speaker corresponding to the selected button.

According to an embodiment, the instructions may cause the processor to receive a user input of selecting one of the first text and the second text displayed in the list, and display a screen of an orientation region where a speaker of the text selected in the list is located among the first orientation region and the second orientation region at a playback time point corresponding to the text selected in the list.

As described above, a method (the method 500 in FIG. 5) of an electronic device includes displaying, when a video supporting a plurality of orientation regions is played, a screen of a first orientation region among the plurality of orientation regions through a display of the electronic device, displaying a first text corresponding to a first speaker in the screen, wherein the first speaker is located in the first orientation region, displaying a second text corresponding to a second speaker in the screen, wherein the second speaker is located in a second orientation region among the plurality of orientation regions, receiving a user input of selecting one of the first text and the second text, and displaying a screen of an orientation region where a speaker corresponding to the selected text is located among the first orientation region and the second orientation region.

According to an embodiment, the displaying of the screen of the orientation region where the speaker corresponding to the selected text is located may include displaying the screen of the first orientation region when the selected text corresponds to the first speaker, wherein the first orientation region may include an orientation region where the first speaker is located in a center of the screen, and displaying the screen of the second orientation region when the selected text corresponds to the second speaker, wherein the second orientation region may include an orientation region where the second speaker is located in a center of the screen.

According to an embodiment, the method may further include displaying an indicator indicating a speaker corresponding to an output voice among the first speaker and the second speaker.

According to an embodiment, the displaying of the first text may include displaying an image of the first speaker together with the first text, and the displaying of the second text may include displaying an image of the second speaker together with the second text.

According to an embodiment, the displaying of the first text or the second text may include displaying the first text or the second text in a form of a speech bubble.

According to an embodiment, the method may further include displaying a list button for calling a list including the first text and the second text, receiving a user input of selecting the list button, displaying the list, and displaying a first button indicating the first speaker and a second button indicating the second speaker on a top of the list.

According to an embodiment, the method may further include receiving a user input of selecting one of the first button and the second button, and controlling the list such that the list includes a plurality of texts of a speaker corresponding to the selected button.

As described above, an electronic device (e.g., the electronic device 101 in FIG. 1) includes a communication module (e.g., the communication module 190 in FIG. 1) receiving a video supporting a plurality of orientation regions, a display (e.g., the display device 160 in FIG. 1), a processor (e.g., the processor 120 in FIG. 1) electrically connected to the display, and a memory (e.g., the memory 130 in FIG. 1) electrically connected to the processor, wherein the memory stores instructions that, when executed by the processor, cause the processor to display, when the video is received through the communication module, a screen of a first orientation region among the plurality of orientation regions through the display, display, when a voice of a first speaker is output, a first text converted from the voice of the first speaker in the screen, wherein the first speaker is located in the first orientation region, display, when a voice of a second speaker is output, a second text converted from the voice of the second speaker in the screen, wherein the second speaker is located in a second orientation region among the plurality of orientation regions, receive a user input of selecting one of the first text and the second text, and display a screen of an orientation region where a speaker corresponding to the selected text is located among the first orientation region and the second orientation region.

According to an embodiment, the instructions may cause the processor to display the screen of the first orientation region when the selected text corresponds to the first speaker, wherein the first orientation region may include an orientation region where the first speaker is located in a center of the screen, and display the screen of the second orientation region when the selected text corresponds to the second speaker, wherein the second orientation region may include an orientation region where the second speaker is located in a center of the screen.

According to an embodiment, the instructions may cause the processor to display an indicator indicating a speaker corresponding to an output voice among the first speaker and the second speaker.

According to an embodiment, the instructions may cause the processor to display an image of the first speaker together with the first text, and display an image of the second speaker together with the second text.

According to an embodiment, the instructions may cause the processor to display the first text or the second text in a form of a speech bubble.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:

1. An electronic device comprising:
a display;
a processor electrically connected to the display; and
a memory electrically connected to the processor,
wherein the memory stores instructions that, when executed by the processor, cause the processor to:
when a video is played, display a screen of a first orientation region corresponding to a specific azimuth among an entirety of a viewing angle supported by the video, through the display, wherein the entirety of the viewing angle is not displayable at once,
display a first text corresponding to a voice of a first speaker included in the screen of the first orientation region, on the screen of the first orientation region,
display a second text corresponding to a voice of a second speaker not included in the screen of the first orientation region, on the screen of the first orientation region,
receive a user input of selecting the second text, and
display a screen of a second orientation region including the second speaker who uttered the selected second text, wherein an azimuth corresponding to the screen of the second orientation region is different from an azimuth corresponding to the screen of the first orientation region.

2. The electronic device of claim 1, wherein the instructions further cause the processor to:
display the screen of the first orientation region when the first text is selected, the first orientation region including an orientation region where the first speaker is located in a center of the screen; and
display the screen of the second orientation region when the second text is selected, the second orientation region including an orientation region where the second speaker is located in a center of the screen.

3. The electronic device of claim 1, wherein the instructions further cause the processor to:
display an indicator indicating a speaker corresponding to an output voice among the first speaker or the second speaker.

4. The electronic device of claim 1, wherein the instructions further cause the processor to:
display an image of the first speaker together with the first text; and
display an image of the second speaker together with the second text.

5. The electronic device of claim 1, wherein the instructions further cause the processor to:
display the first text or the second text in a form of a speech bubble.

6. The electronic device of claim 5, wherein the instructions further cause the processor to:
display a list button for calling a list including the first text and the second text through the display;
receive a user input of selecting the list button;
display the list via the display; and
display a first button indicating the first speaker and a second button indicating the second speaker at a top of the list.

7. The electronic device of claim 6, wherein the instructions further cause the processor to:
receive a user input of selecting one of the first button or the second button; and
control the list such that the list includes a plurality of texts of a speaker corresponding to the selected button.

8. The electronic device of claim 6, wherein the instructions further cause the processor to:
receive a user input of selecting one of the first text or the second text displayed in the list; and
display a screen of an orientation region where a speaker of the selected text is located among the first orientation region or the second orientation region at a playback time point corresponding to the selected text.

9. A method of an electronic device, the method comprising:
when a video is played, displaying a screen of a first orientation region corresponding to a specific azimuth among an entirety of a viewing angle supported by the video, through a display, wherein the entirety of the viewing angle is not displayable at once;

displaying a first text corresponding to a first speaker included in the screen of the first orientation region, on the screen of the first orientation region;

displaying a second text corresponding to a second speaker not included in the screen of the first orientation region, on the screen of the first orientation region;

receiving a user input of selecting the second text; and displaying a screen of a second orientation region including the second speaker who uttered the selected second text, wherein an azimuth corresponding to the screen of the second orientation region is different from an azimuth corresponding to the screen of the first orientation region.

10. The method of claim 9, further comprising:

displaying the screen of the first orientation region when the first text is selected, the first orientation region including an orientation region where the first speaker is located in a center of the screen; and displaying the screen of the second orientation region when the second text is selected, the second orientation region including an orientation region where the second speaker is located in a center of the screen.

11. The method of claim 9, further comprising:

displaying an indicator indicating a speaker corresponding to an output voice among the first speaker or the second speaker.

12. The method of claim 9, wherein the displaying of the first text comprises displaying an image of the first speaker together with the first text, and wherein the displaying of the second text comprises displaying an image of the second speaker together with the second text.

13. The method of claim 9, wherein the displaying of the first text or the second text comprises displaying the first text or the second text in a form of a speech bubble.

14. The method of claim 13, further comprising:

displaying a list button for calling a list including the first text and the second text;

receiving a user input of selecting the list button;

displaying the list; and displaying a first button indicating the first speaker and a second button indicating the second speaker at a top of the list.

15. The method of claim 14, further comprising:

receiving a user input of selecting one of the first button or the second button; and controlling the list such that the list includes a plurality of texts of a speaker corresponding to the selected button.

* * * * *